United States Patent
Patterson

(10) Patent No.: US 7,916,397 B2
(45) Date of Patent: Mar. 29, 2011

(54) MICRO ARRAY LENS USING OPTICAL FIBER

(75) Inventor: Joseph Martin Patterson, Carlsbad, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 0 days.

(21) Appl. No.: 12/822,070

(22) Filed: Jun. 23, 2010

(65) Prior Publication Data

US 2010/0259831 A1 Oct. 14, 2010

Related U.S. Application Data

(62) Division of application No. 12/352,640, filed on Jan. 13, 2009, now Pat. No. 7,768,706.

(51) Int. Cl.
G02B 27/10 (2006.01)
(52) U.S. Cl. .................................. 359/624; 359/628
(58) Field of Classification Search .................. 359/624, 359/628
See application file for complete search history.

(56) References Cited

U.S. PATENT DOCUMENTS 5,251,065 A * 10/1993 Uetsuki .................... 359/454

* cited by examiner

Primary Examiner — Joseph Martinez
(74) Attorney, Agent, or Firm — Law Office of Gerald Maliszewski; Gerald Maliszewski

(57) ABSTRACT

An optical fiber micro array lens is provided along with an associated fabrication method. The micro array lens is fabricated from a mesh of optical fibers. The mesh includes a first plurality of cylindrical optical fibers. Each fiber from the first plurality has a flat bottom surface and a hemicylindrical top surface. The top and bottom surfaces are aligned in parallel with a central fiber axis. The mesh also includes a second plurality of cylindrical optical fibers. Each fiber from the second plurality has a hemicylindrical bottom surface overlying and in contact with the top surfaces of the first plurality of optical fibers, and a flat top surface. The top and bottom surfaces are aligned in parallel with a central fiber axis. Each contact of the first and second plurality of optical fibers forms a lens assembly in a micro array of lenses.

10 Claims, 10 Drawing Sheets

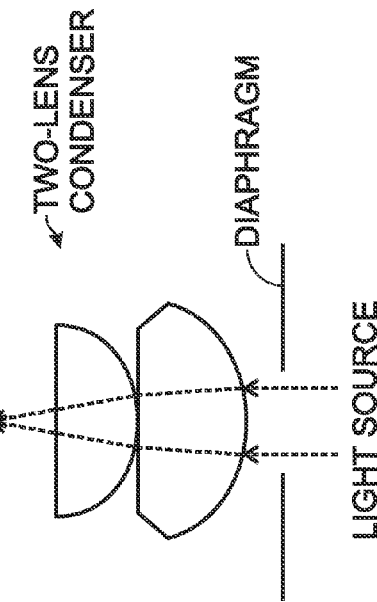
Fig. 2
(PRIOR ART)
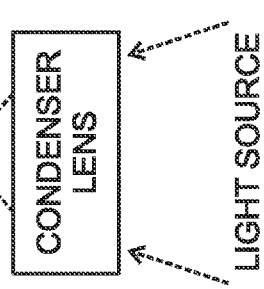
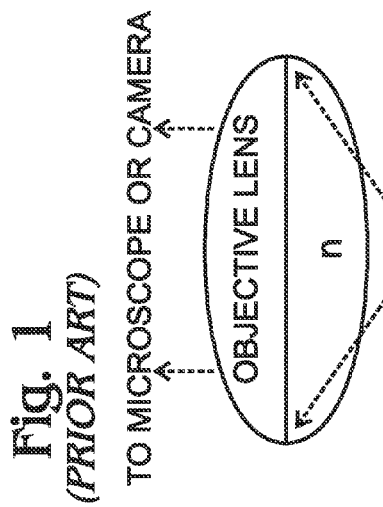
Fig. 1
(PRIOR ART)
Fig. 3B
FIBER SHAPE PRIOR TO POLISHING

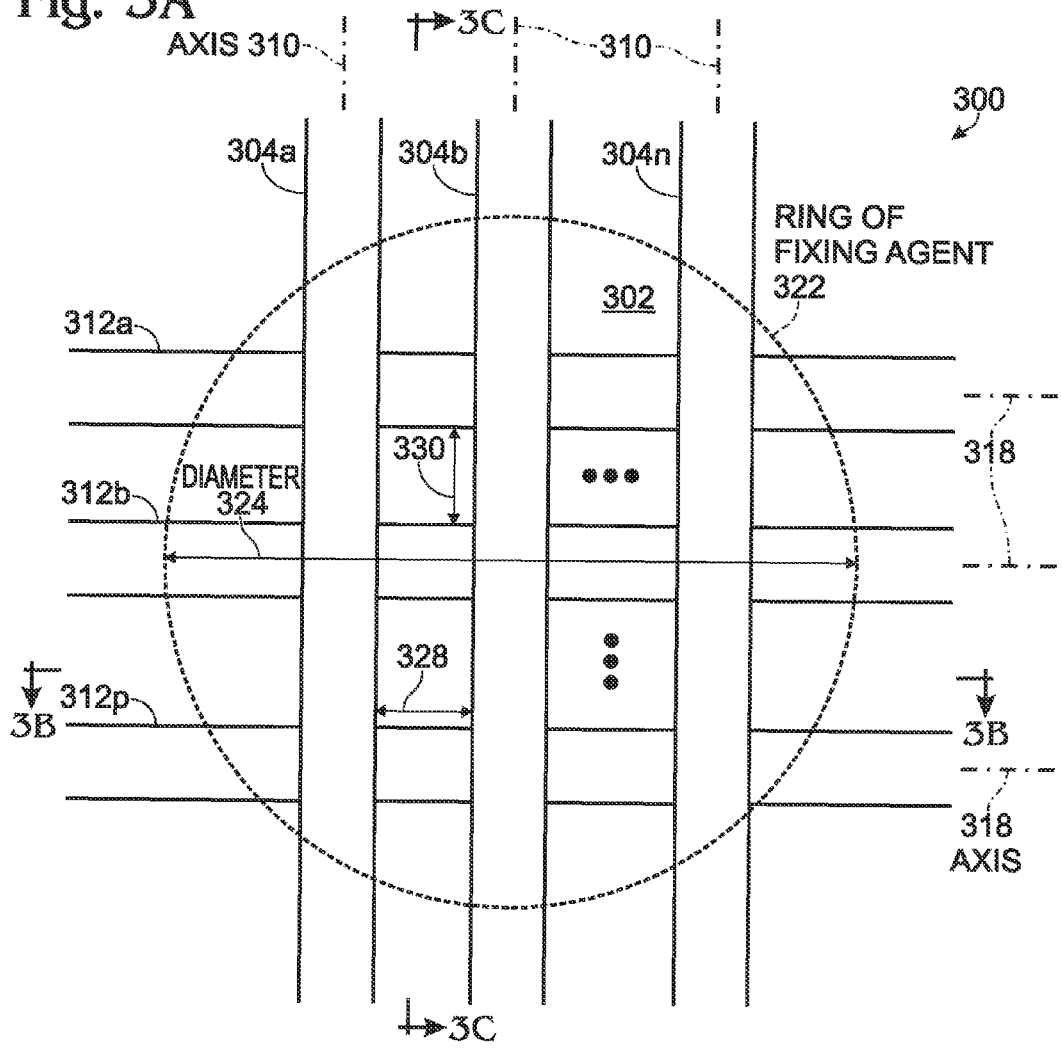
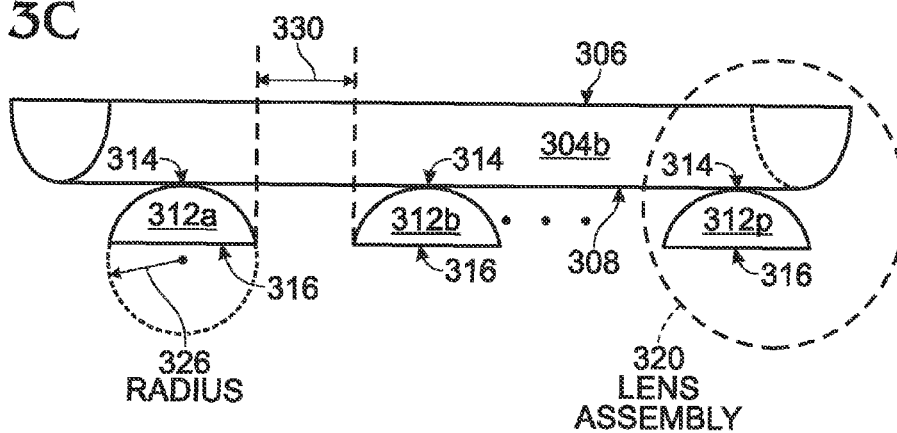

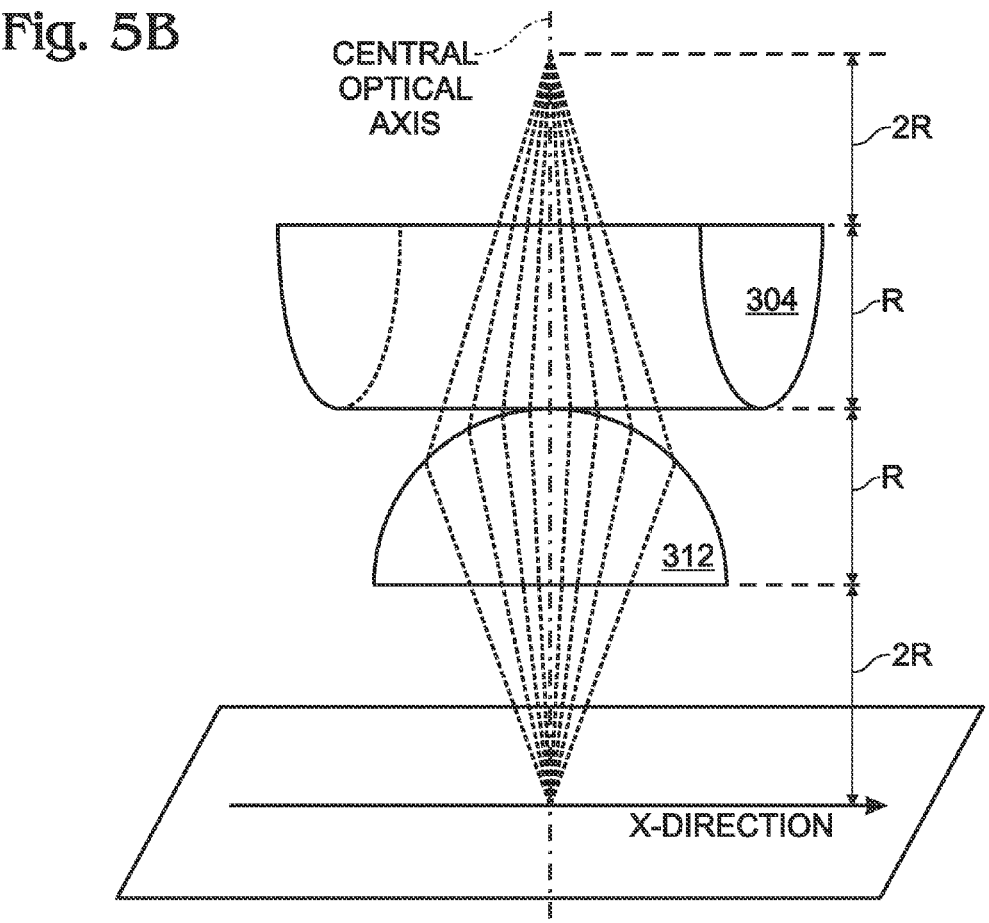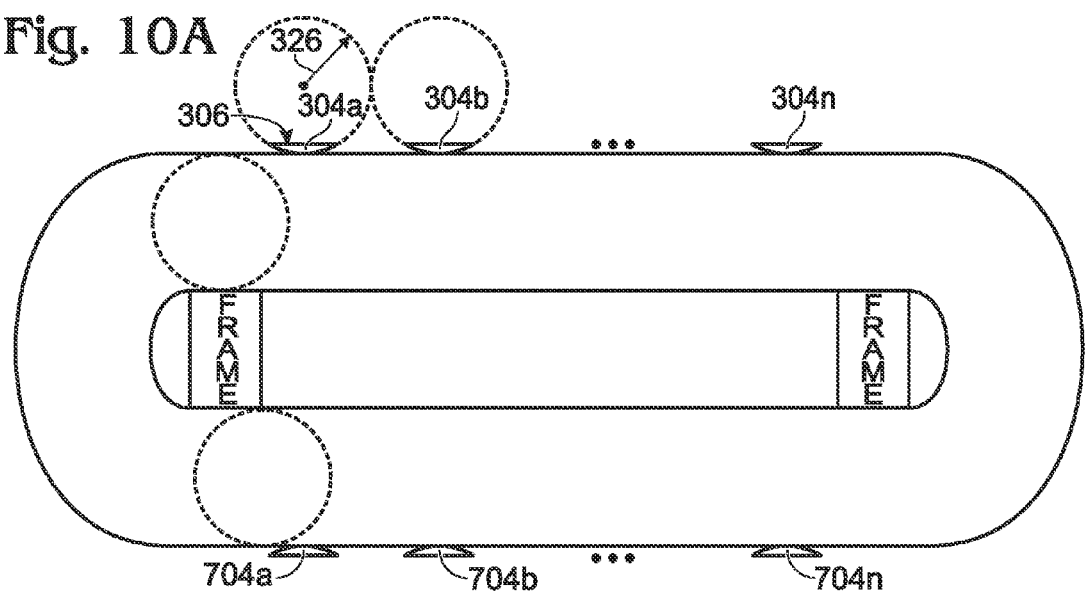

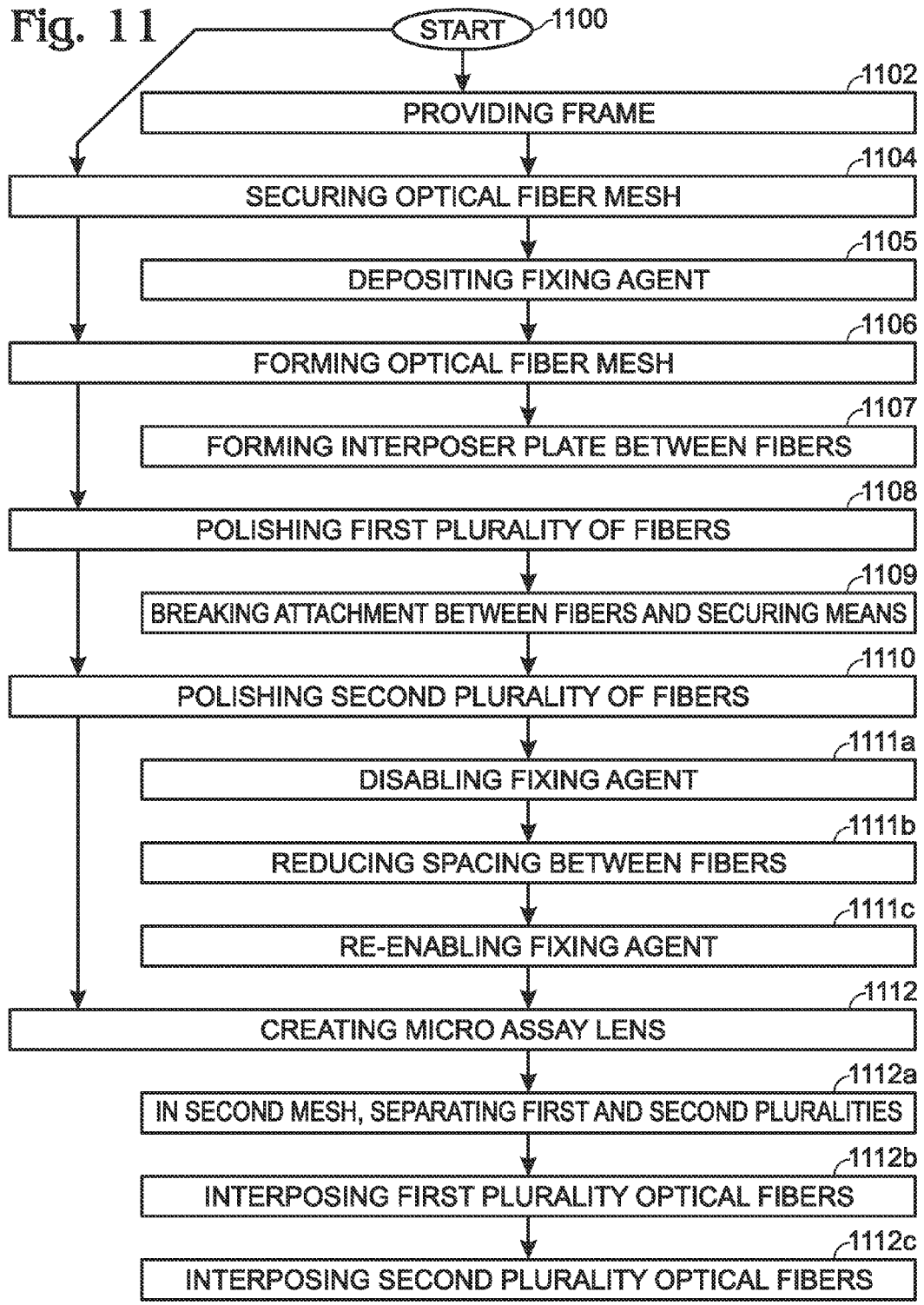

MICRO ARRAY LENS USING OPTICAL FIBER

RELATED APPLICATIONS

This application is a Divisional of a patent application entitled, OPTICAL FIBER MICRO ARRAY LENS, invented by Joseph Patterson, Ser. No. 12/352,640, filed Jan. 13, 2009, now U.S. Pat. No. 7,768,706 which is incorporated herein by reference.

BACKGROUND OF THE INVENTION

1. Field of the Invention

This invention generally relates to optical lens and, more particularly, to a micro array of lens assemblies made from optical fiber and an associated fabrication process.

2. Description of the Related Art

FIG. 1 is a conventional microscope objective with condenser lens (prior art). In the visual inspection and an analysis of integrated circuit (IC), a microscope is typically employed, as the IC features can be quite small. Conventionally, a single lens is used at a localized position, with lighting applied to the backside of an IC or an IC embedded in a package.

The ability of a microscope objective to capture deviated light rays from a specimen is dependent upon both the numerical aperture (NA) and the refractive index (n) of the medium through which the light travels, as follows:

$$(NA) = n(\sin m);$$

where m is one-half the angular aperture of the objective.

Because sin m cannot be greater than 90 degrees, the maximum possible numerical aperture is determined by the refractive index of the immersion medium. Most microscope objectives use air as the medium through which light rays must pass between the sample and front lens of the objective. Objectives of this type are referred to as dry objectives because they are used without liquid imaging media. Air has a refractive index of 1.0003, very close to that of a vacuum and considerably lower than most liquids, including water (n=1.33), glycerin (n=1.470) and common microscope immersion oils (average n=1.515). The index of refraction of the silicon die is 3.42. Fiber optic material is also available made of silicon, with an index of refraction that perfectly matches an IC die. For near infrared fused silica, fused quartz, or BK7, glass can be used. In practice, the maximum numerical aperture of a dry objective system is limited to 0.95, and greater values can only be achieved using optics designed for immersion media.

Microscope objectives designed for use with immersion oil have a number of advantages over those that are used dry. Immersion objectives are typically of higher correction (either fluorite or apochromatic) and can have working numerical apertures up to 1.40 when used with immersion oil having the proper dispersion and viscosity. These objectives allow the substage condenser diaphragm to be opened to a greater degree, thus extending the illumination of the specimen and taking advantage of the increased numerical aperture.

A factor that is commonly overlooked when using oil immersion objectives of increased numerical aperture is limitations placed on the system by the substage condenser. In a situation where an oil objective of NA=1.40 is being used to image a specimen with a substage condenser of smaller numerical aperture (1.0 for example), the lower numerical aperture of the condenser overrides that of the objective and the total NA of the system is limited to 1.0, the numerical aperture of the condenser. One complicated solution to this problem is to also use an oil medium between condenser lens system and the specimen.

The substage condenser gathers light from the microscope light source and concentrates it into a cone of light that illuminates the specimen with uniform intensity over the entire viewfield. It is critical that the condenser light cone be properly adjusted to optimize the intensity and angle of light entering the objective front lens. Each time an objective is changed, a corresponding adjustment must be performed on the substage condenser to provide the proper light cone for the numerical aperture of the new objective.

FIGS. 12A and 12B depict a cylindrical lens (prior art). A cylindrical lens focuses light along a single axis, forming a line image from incident parallel beams.

FIG. 13 depicts a plano-convex lens (prior art). A plano-convex lens is useful in collimating a parallel beam from a point of light. Two plan-convex lenses, oriented with their convex sides facing each other, act as a relay lens, and can be used to relay an image.

FIG. 2 is a diagram of a simple two-lens Abbe condenser (prior art). Light from the microscope illumination source passes through the condenser aperture diaphragm, located at the base of the condenser, and is concentrated by internal lens elements, which then projects light through the specimen in parallel bundles from every azimuth. The size and numerical aperture of the light cone is determined by adjustment of the aperture diaphragm. Correct positioning of the condenser with relation to the cone of illumination and focus is critical to quantitative microscopy and optimum photomicrography.

While a high magnification lens may be desirable for small, narrowly defined specimens, it may not be desirable for larger fields of view. As a result, if a conventional high magnification microscope is used, an IC failure or combination of connected IC features may only be understood by finding and viewing multiple high-magnification images. Further, high magnification lens are fragile, easily damaged, expensive, not made for large area viewing at low magnifications.

Generally, there is a need to efficiently collect light through the back of an IC, and transfer the light to a sensor or camera with minimal loss. With the emergence of IC back side analysis, there is a need for lenses that are compatible with the index of refraction of silicon, which is much higher than glass and air, that also have a high collection efficiency. That is, the numerical aperture must be such that it can be placed in contact with the planar surface of the back of the silicon die.

It would be advantageous if a single, high magnification silicon immersion lens (SIL) could be replaced with a micro array of lens having a low magnification, for a larger field of view in semiconductor contact analysis.

SUMMARY OF THE INVENTION

A micro array lens is disclosed, fabricated from optical fibers. The invention provides an inexpensive means to manufacture microscopic optical array lenses for immersion or contact applications in the analysis of semiconductors. The micro array lens can efficiently collect light through the back of integrated circuits and transfer the light to a sensor or camera with minimal loss. The micro array lens has, an index of refraction compatible with silicon, which is much higher than glass and air, with a high collection efficiency (numerical aperture) that permits the lens to be placed in contact with the planar surface of the back of the silicon die. Thus, the micro array lens can be as part of a microscope/macroscope or camera interface, for imaging samples such as integrated circuits.

The micro array lens is made with optical fibers. The fibers are arranged on a fixture that holds them in two parallel groups, 90 degrees to each other in an array. Both sides of the fibers are polished flat to form two plano-convex lenses in contact with each other.

Accordingly, an optical fiber micro array lens is provided. The micro array lens is fabricated from a mesh of optical fibers. The mesh includes a first plurality of cylindrical optical fibers. Each fiber from the first plurality has a flat bottom surface and a hemicylindrical top surface. The top and bottom surfaces are aligned in parallel with a central fiber axis. The mesh also includes a second plurality of cylindrical optical fibers. Each fiber from the second plurality has a hemicylindrical bottom surface overlying and in contact with the top surfaces of the first plurality of optical fibers, and a flat top surface. The top and bottom surfaces are aligned in parallel with a central fiber axis. Each contact of the first and second plurality of optical fibers forms a lens assembly in a micro array of lenses.

Typically, the central axes of first plurality of optical fibers are parallel to each other. The central axes of the second plurality of optical fibers are parallel to each other and orthogonal to the first plurality of optical fiber central axes. In another aspect, each optical fiber in the first and second plurality of optical fibers has a hemicylindrical radius. The mesh of optical fibers may include a spacing of up to 100% of the optical fiber hemicylindrical radius between adjacent optical fibers in the first plurality of optical fibers, and with a spacing of up to 100% of the optical fiber hemicylindrical radius between adjacent optical fibers in the second plurality of optical fibers. Alternately, adjacent parallel fibers may be in contact with each other, regardless of the depth of fiber polishing.

Additional details of the above-described micro array of lens and a method for fabricating a micro array lens of optical fibers are provided below.

BRIEF DESCRIPTION OF THE DRAWINGS

FIG. 1 is a conventional microscope objective with condenser lens (prior art).

FIG. 2 is a diagram of a simple two-lens Abbe condenser (prior art).

FIG. 3A is a plan view of an optical fiber micro array lens, while FIGS. 3B and 3C are partial cross-sectional views of the micro array lens of FIG. 3A.

FIGS. 5A and 5B are detailed cross-sectional views depicting a single lens assembly.

FIGS. 10A through 10E depict steps in the fabrication of a 2-mesh micro array lens using the frame shown in FIG. 9.

FIG. 11 is a flowchart illustrating a method for fabricating an optical fiber micro array lens.

DETAILED DESCRIPTION

Figure 4A:
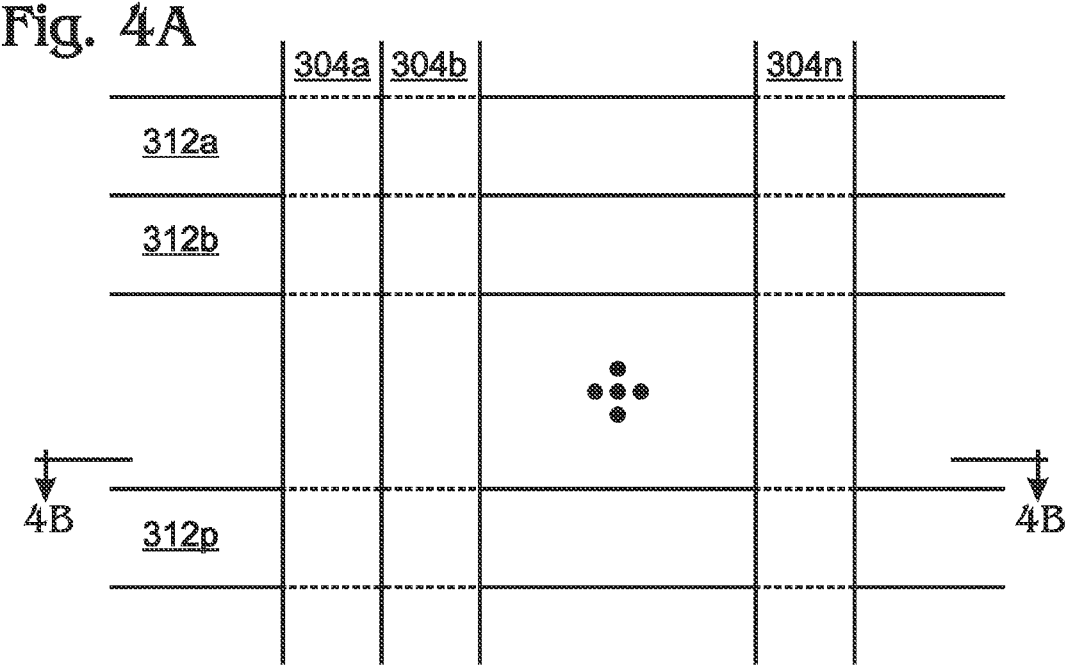
FIGS. 4A and 4B are plan and partial cross-sectional views, respectively, of a variation of the optical fiber micro array lens depicted in FIGS. 3A and 3B.

FIG. 3A is a plan view of an optical fiber micro array lens, while FIGS. 3B and 3C are partial cross-sectional views of the micro array lens of FIG. 3A. The micro array lens 300 comprises a mesh 302 of optical fibers. More explicitly, the mesh 302 includes a first plurality of cylindrical optical fibers 304. Shown are fibers 304a through 304n, where n is not limited to any particular value. Each fiber 304 from the first plurality has a flat bottom surface 306 and a hemicylindrical top surface 308. The top and bottom surfaces 306/308 are aligned in parallel with a central fiber axis 310. The mesh 302 also includes a second plurality of cylindrical optical fibers 312. Shown are fibers 312a through 312p, where p is not limited to any particular value. Each fiber 312 from the second plurality has a hemicylindrical bottom surface 314 overlying and in contact with the top surfaces 306 of the first plurality of optical fibers 304, and a flat top surface 316. The top and bottom surfaces 314/316 are aligned in parallel with a central fiber axis 318. Each contact of the first plurality of optical fibers 304 and the second plurality of optical fibers 312 forms a lens assembly 320 in a micro array of lenses. There are many types of optical fiber known in the art, which can be used to enable the micro array lens.

Conventional optical fibers often include a core, a cladding layer over the core, a buffering layer over the cladding, and a jacket overlying the core. In one aspect, first and second pluralities of optical fibers 304/312 are optical fiber cores. Typically, the central axes 310 of first plurality of optical fibers 304 are parallel to each other, and the central axes 318 of the second plurality of optical fibers 312 are parallel to each other and orthogonal to the first plurality of optical fiber central axes 310.

As shown in FIG. 3A, the mesh 302 of optical fibers includes a ring 322 of fixing agent. The hardened fixing agent may be wax or epoxy. However, the lens is not limited to any particular fixing agent or means of arranging the fibers. As shown, the ring of fixing agent 322 has an inside diameter 324 of about 1 inch. However, other diameters may also be useful.

Figure 4B:
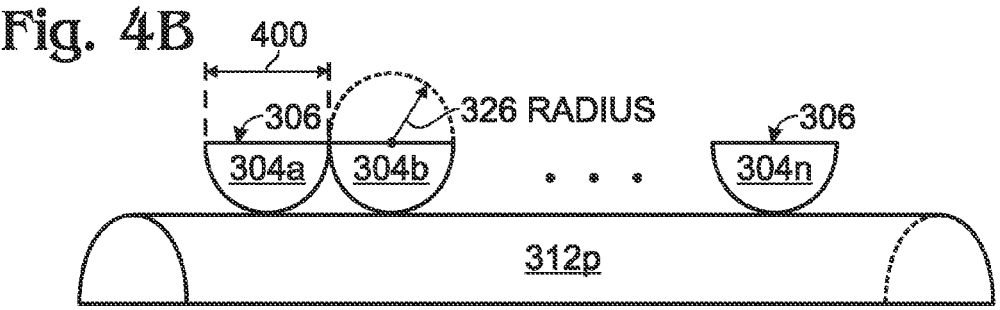

In another aspect, each optical fiber in the first and second plurality of optical fibers 304/312 has a hemicylindrical radius 326. The mesh 302 of optical fibers includes a spacing 328 of up to 100% of the optical fiber hemicylindrical radius 326 between adjacent optical fibers in the first plurality of optical fibers 304. Likewise there is a spacing 330 of up to 100% of the optical fiber hemicylindrical radius 326 between adjacent optical fibers in the second plurality of optical fibers 312. Note: in other aspects not shown, the radius of the first plurality of optical fibers can be different than the radius of the second plurality of optical fibers. It should also be noted that the hemispherical radius 326 may be less than the optical fiber radius prior to fabrication, as explained in more detail below. As shown in FIGS. 4A and 4B, the phantom lines associated with fibers 304a, 304b, and 312 depict the cross-sectional shape of the fibers prior to polishing.

FIGS. 4A and 4B are plan and partial cross-sectional views, respectively, of a variation of the optical fiber micro array lens depicted in FIGS. 3A and 3B. In this aspect, the fibers are not polished as deeply. As a result, parallel fibers remain touching after polishing. That is, the flat surface 306 of fiber 304a has a width 400 about equal to twice the fiber radius 326 (as measured prior to polishing).

Alternately stated, adjacent optical fibers in the first plurality of optical fibers (e.g., fibers 304a and 304b) are in contact with each other, and adjacent optical fibers in the second plurality of optical fibers are in contact with each other.

Figure 5A:
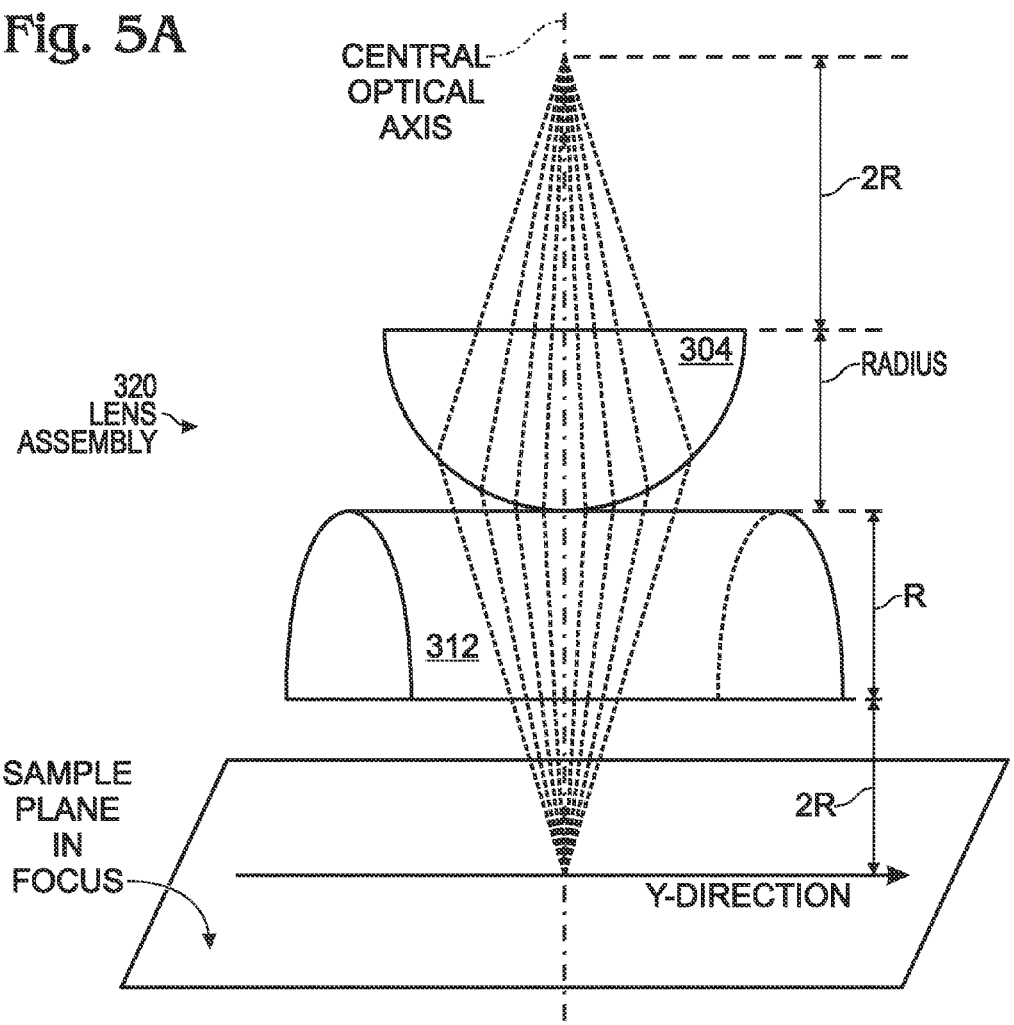

FIGS. 5A and 5B are detailed cross-sectional views depicting a single lens assembly in orthogonal planes. The lens assembly 320 has a focal length 500 responsive to the hemicylindrical radius 326 of fibers 304 from the first plurality of optical fibers and fibers 312 from the second plurality of optical fibers. As shown in FIG. 5A, light rays traveling in a plane parallel to the Y direction are bent by fiber 304, which has a convex shape in that direction. Because the surface of fiber 312 is not curved in the Y direction, rays traveling in a plane parallel to the Y direction are not bent. The focal length of each lens in the assembly is equal to 2R, and is a functions of the radius of fiber curvature. The focal length can be changed by using fibers having a different diameter. More explicitly, there is a front focal length and a back focal length. The front focal length is from the bottom lens to the sample focal plane=2R, and the back focal length is the distance from the top lens to the detector/camera when in focus, also=2R in this case. The total image transfer distance is 6R for lenses polished to half the starting thickness. When polished further, the front and back focal lengths are still 2R, but the total distance from sample to detector is less than 6R.

As shown in FIG. 5B, light rays traveling in a plane parallel to the X direction are not bent by fiber 304, because the fiber has no curve in that direction. Because the surface of fiber 312 is convex in the X direction, rays traveling in a plane parallel to the X direction are bent. Again, the focal length is equal to 2R, and can be changed by using fibers having a different diameter.

Figure 6:
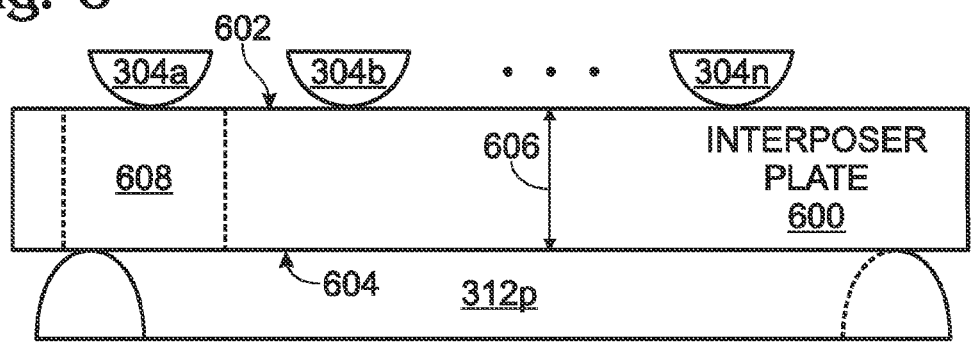
FIG. 6 is a partial cross-sectional view depicting a first variation of the micro array lens of FIG. 3B.

FIG. 6 is a partial cross-sectional view depicting a first variation of the micro array lens of FIG. 3B. The optical fibers in the first plurality of optical fibers 304 and the second plurality of optical fibers 312 each have a first index of refraction. As shown, an interposer plate 600 has a plano surface 602 adjacent the hemicylindrical top surfaces 308 of the first plurality of optical fibers 304 and a plano surface 604 adjacent the hemicylindrical bottom surfaces 314 of the second plurality of optical fibers 312. The interposer plate 600 has a thickness 606 between plano surfaces 602 and 604. Typically, the interposer plate has an index of refraction close to, or equal to the first index of refraction. Each lens assembly (e.g., the lens assembly formed by fibers 304a and 312p) now includes a portion 608 of interposer plate between corresponding fibers from the first and second plurality of fibers 304 and 312, and has a magnification factor responsive to the interposer plate thickness 606. Alternately but not shown, adjacent fibers in the first plurality of optical fibers may be in contact with each other, as shown in FIGS. 4A, 4B, 7A, and 7B. Likewise, adjacent fibers in the second plurality of optical fibers may be in contact with each other.

Figure 7B:
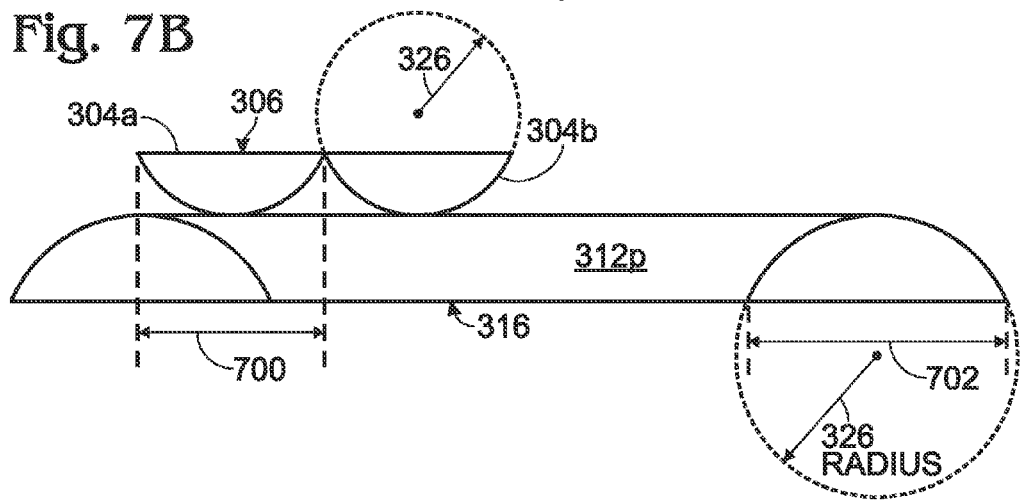
FIGS. 7A and 7B are plan and partial cross-sectional views, respectively, depicting a second variation of the micro array lens of FIGS. 4A and 4B.
Figure 7A:
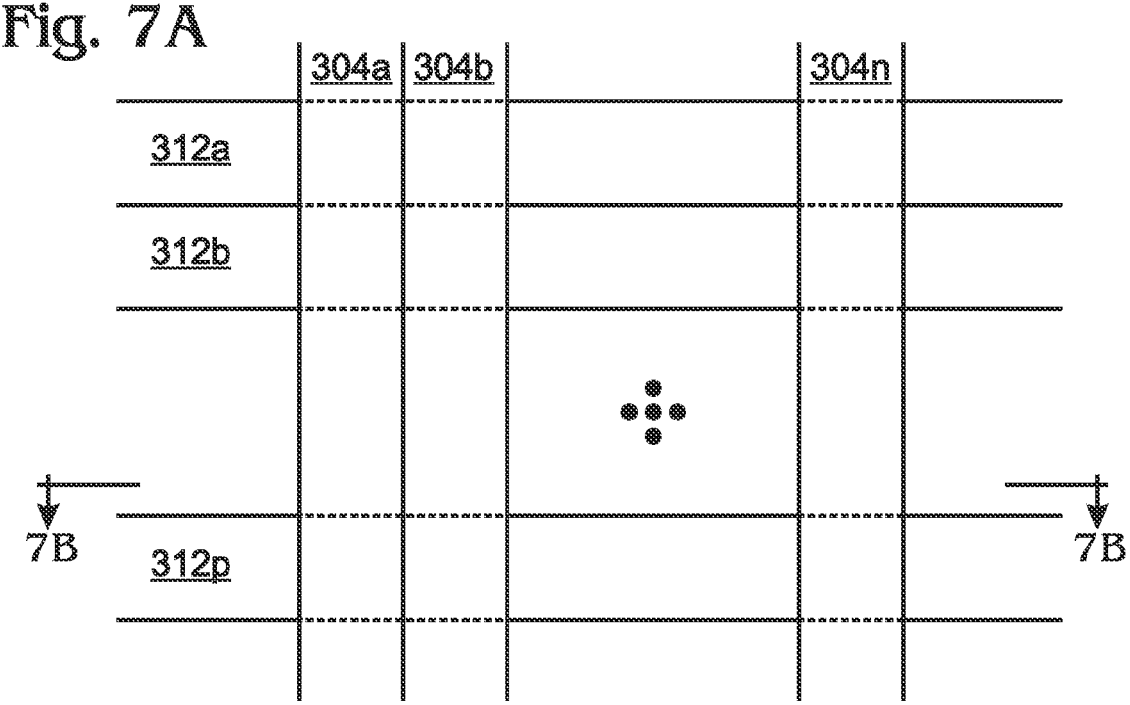

FIGS. 7A and 7B are plan and partial cross-sectional views, respectively, depicting a second variation of the micro array lens of FIGS. 4A and 4B. In the aspect however, the optical fibers in the first plurality of optical fibers 304 have a cross-sectional width 700 across flat surface 306 that is less than the diameter of the optical fibers and greater than, or equal to the radius 326 of the optical fibers. Likewise, the optical fibers in the second plurality of optical fibers 312 have a cross-sectional width 702 across their flat surfaces 316 that is less than the diameter of the optical fibers and greater than, or equal to the radius of the optical fibers. Typically, the outer 25% of a spherical lens does not refocus the rays very well, so it is better if it is removed. However, such a deep polishing creates a space between adjacent fibers. As explained in more detail below, the spaces can be removed by either pushing the fibers together after polishing, or inserting additional polished fibers in the spaces between fibers.

The above-described micro array lens can be used to image through to a microscope or camera for example, and can also be the path that the illumination light passes through when viewing the image. Generally, its function is an objective lens, and its configuration is closest to a condenser lens. More explicitly, the configuration is that of a "relay" lens. It can be used to replace the function of a conventional relay lens that works at a greater distance from the specimen. Advantageously, the above-described micro array lens can be placed in contact with the sample being viewed, so it is not at a distance. It is called a relay lens because it is typically not used to magnify (1 to 2× typically), just capture the light from the sample and transfer it to a camera or detector for viewing. Alternately stated, relay lenses do not really magnify the image of the sample very much, they just move the sample focal plane to the detector focal plane unaltered. The advantage is that most of the light from the sample is captured because the lens is so close that it intercepts all the light rays from the sample before they diverge.

A condenser lens in typical applications does capture the light from a small source like a light bulb that is spreading out in all directions from a bright spot of the filament. At the output side of the lens, the light rays are distributed out in parallel so that they can be directed down a microscope system to illuminate the sample being viewed.

In the above-described micro array lens, each lens assembly is not a complete plano-covex lens in that the spherical side is only spherical in one axis. Since the other axis is linear (flat), it may be called a bar lens. Bar lens are typically used as magnifiers, e.g., for reading small print. Each (first) fiber acts as a bar lens. But since the second set of fibers is perpendicular to the first set of fibers, each first fiber lens is effectively cut up into many segments the size of the second fiber diameter. One set of fibers focuses in one axis and the other set of fibers focuses in the other axis. The two groups of fibers combined perform the function of one plano-convex lens. However, the micro array lens is an array of many plano-convex lens assemblies.

The magnification of each lens assembly is only one to two times and is changed by separating the lenses (fibers). This separation can be accomplished by placing a thin plain piece of material between the two groups of fibers, see FIG. 6. For example, a glass interposer plate might be used for visible light. Other interposer plate materials might also be used, for example, material more conducive to transmitting infrared wavelengths. The focal length of each lens (polished fiber) is determined by the diameter of the fiber. Note: if the convex sides of the fibers are faced away from each other, not shown, the micro array lens may be more suitable as a flood source than as a point source.

Glass optical fibers are almost always made from silica, but some other materials, such as fluorozirconate, fluoroaluminate, and chalcogenide glasses, are used for longer-wavelength infrared applications. Like other glasses, these glasses have a refractive index of about 1.5. The best material for use with semiconductor circuits is silicon. Some fibers are made of silicon for infrared applications.

Figure 8:
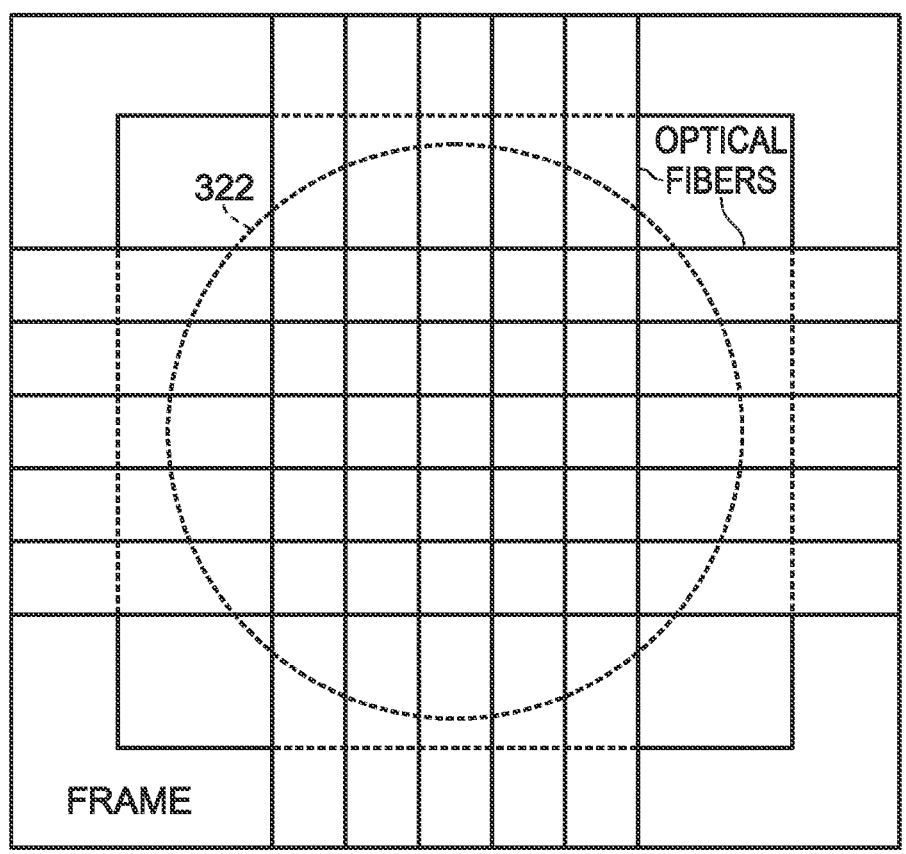
FIG. 8 is a plan view depicting the fabrication of a micro array lens in a frame.

FIG. 8 is a plan view depicting the fabrication of a micro array lens in a frame. In one implementation, the micro array lens is fabricated by arranging the fibers on a fixture in two parallel groups, at 90 degrees to each other in an array. Both sides of the fibers are polished flat to form two plano-convex lenses in contact with each other, as shown in FIG. 3B. It should be understood that although only a single mesh is shown secured by fixing agent ring 322, in commercial fabrication processes a plurality of adjoining meshes may be formed to enjoy an economy of scale. Note: in the interest of clarity, spaces are shown between adjacent parallel optical fibers. However, in actual fabrication, adjacent optical fibers are likely to be in contact along their lengths.

Figure 9:
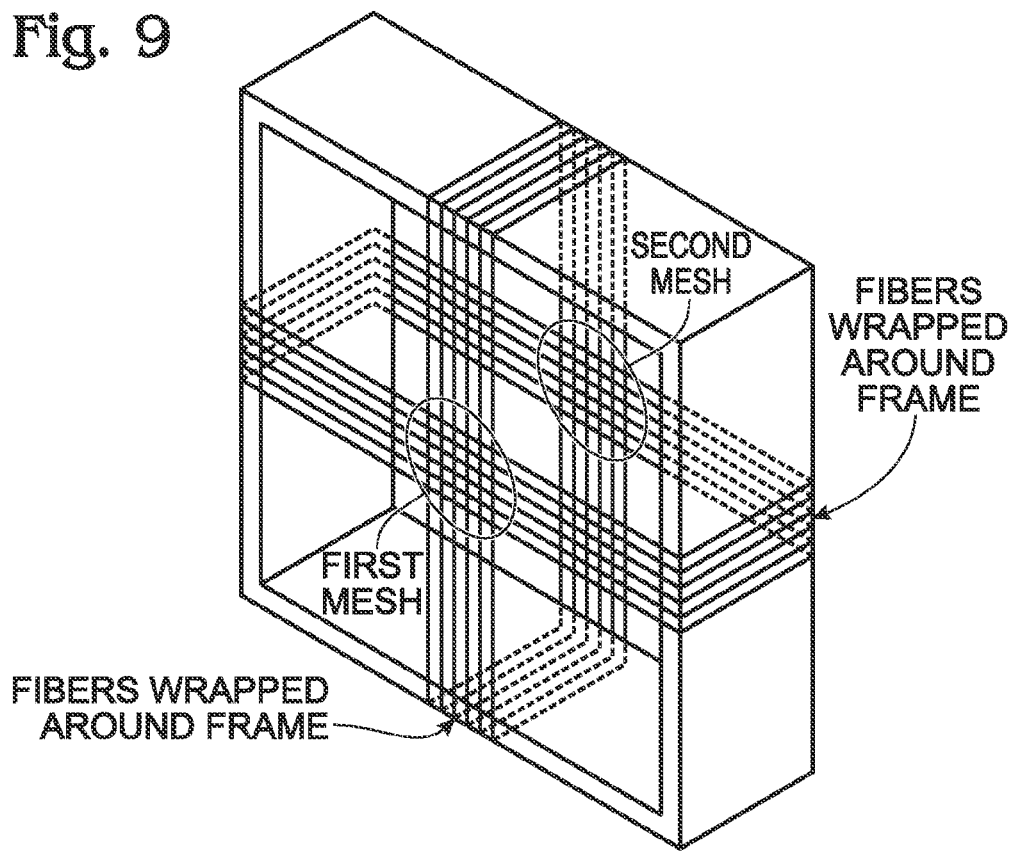
FIG. 9 is a perspective view depicting a variation of the frame structure shown in FIG. 8.

FIG. 9 is a perspective view depicting a variation of the frame structure shown in FIG. 8. Advantageously, this frame permits 2 meshes of optical fibers to be fabricated simultaneously. In one aspect (see FIGS. 7A and 7B), and as explained in greater detail below, such a frame also permits to meshes to be interposed between each other, to eliminate spaces between the optical fibers after polishing. Note: in the interest of clarity, spaces are shown between adjacent parallel optical fibers. However in actual fabrication, adjacent parallel optical fibers are likely to be in contact along their lengths.

Figure 10B:
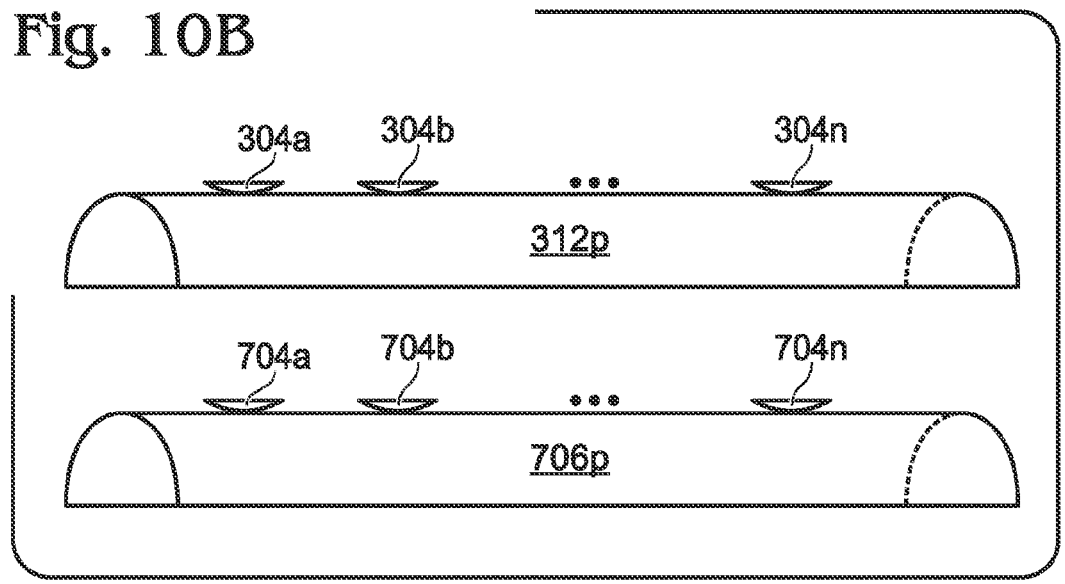

FIGS. 10A through 10E depict steps in the fabrication of a 2-mesh micro array lens using the frame shown in FIG. 9. FIG. 10A is a partial cross-sectional view of the first and second meshes after the application of a fixing agent and polishing operations. More explicitly, the bottom surfaces of the first plurality of optical fibers in the first and second meshes are polished. It should be understood that although only a single mesh is shown in each frame opening, in commercial-fabrication processes a plurality of adjoining meshes may be formed to enjoy an economy of scale. Typically, the optical fibers are polished sufficiently to form flat surfaces 306 with a cross-sectional width 1000 that is less than the optical fiber diameter (twice radius 326), as measured prior to polishing.

In FIG. 10B, the first and second meshes are freed from the frame, and the top surfaces of the second plurality of optical fibers in the first and second meshes are polished.

Figure 10C:
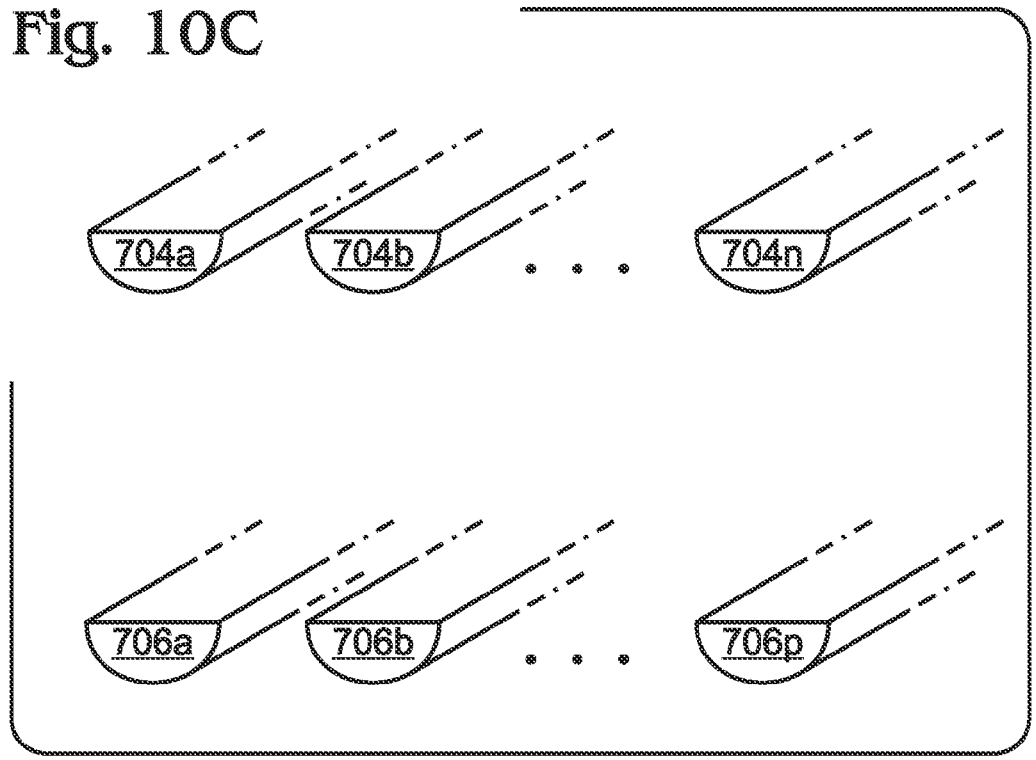

FIG. 10C is a perspective view of the second mesh. The first plurality of optical fibers are separated from the second plurality of optical fibers in the second mesh. The first plurality of optical fibers is secured as a unit of parallel fibers, with spaces between adjoining fibers. Likewise, the second plurality of optical fibers is secured as a unit of parallel fibers, with spaces between adjoining fibers.

Figure 10D:
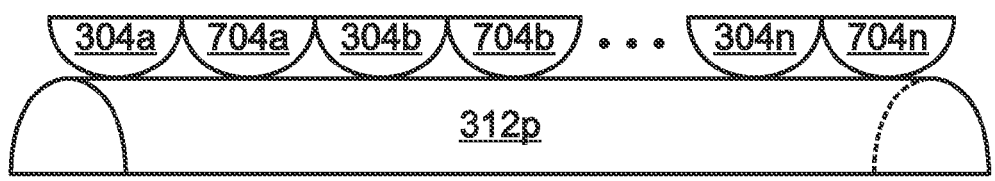

FIG. 10D is a partial cross-sectional view of the finished micro array lens. The first plurality of optical fibers from the second mesh is interposed between the first plurality of optical fibers from the first mesh. Typically, adjacent parallel fibers are in contact with each other.

Figure 10E:
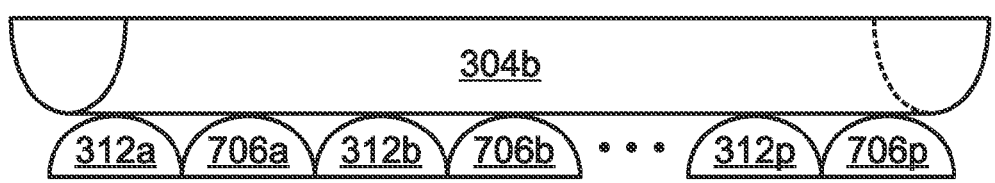
Figure 12A:
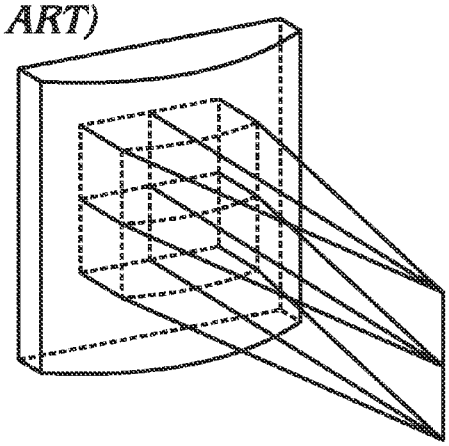
FIGS. 12A and 12B depict a cylindrical lens (prior art).
Figure 12B:
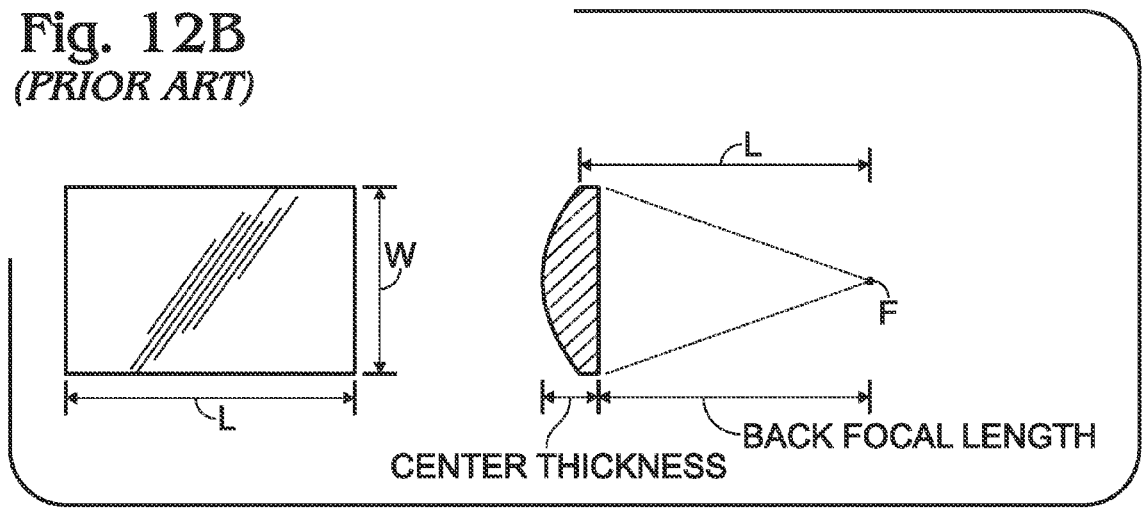
Figure 13:
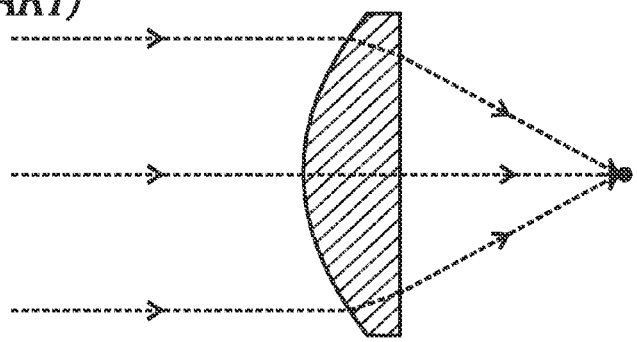
FIG. 13 depicts a plano-convex lens (prior art).

FIG. 10E is a partial cross-sectional view of FIG. 10D showing the second plurality of optical fibers from the second mesh interposed between the second plurality of optical fibers from the first mesh. Typically, adjacent parallel fibers are in contact with each other. A plan view of the finished product is shown in FIG. 7A.

FIG. 11 is a flowchart illustrating a method for fabricating an optical fiber micro array lens. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 1100.

Step 1102 provides a rigid frame structure with a perimeter. Step 1104 secures the mesh of optical fibers to the frame perimeter. Step 1106 forms a mesh of optical fibers. The mesh includes a first plurality of cylindrical optical fibers underlying and in contact with a second plurality of cylindrical optical fibers. Typically, the mesh of optical fibers is formed from a first and second plurality optical fiber cores. Step 1108 polishes the bottom surfaces of the first plurality of optical fibers. Step 1110 polishes the top surfaces of the second plurality of optical fibers. Step 1112 creates a micro array of lens assemblies.

In one aspect, forming the mesh of optical fibers in Step 1106 includes forming a first plurality optical fibers with parallel central axes, and a second plurality of optical fibers with parallel central axes, where the central axes of first plurality of optical fibers are orthogonal to the central axes of the second plurality of optical fibers.

In another aspect, Step 1106 forms a mesh of first and second plurality of optical fibers, where each fiber has a first fiber diameter. Then, polishing the bottom surfaces of the first plurality of optical fibers in Step 1108 includes creating cross-sectional flat surfaces having a width greater than 50% of the first fiber diameter, and polishing the top surfaces of the second plurality of optical fibers in Step 1110 includes creating cross-sectional flat surfaces having a width greater than 50% of the first fiber diameter. Further, creating the micro array of lens assemblies in Step 1112 may include creating a spacing of up to 50% of the first fiber diameter between adjacent optical fibers in the first plurality of optical fibers, and with a spacing of up to 50% of the first fiber diameter between adjacent optical fibers in the second plurality of optical fibers. Note: the above-mentioned spacings are measured after polishing in Steps 1108 and 1110. Prior to polishing, parallel fibers are spaced less than a fiber radius apart, and may even be touching prior to polishing. In addition, Step 1112 creates lens assemblies having a focal length responsive to the first fiber diameter.

In another aspect, forming the mesh of optical fibers in Step 1106 includes forming a first plurality of optical fibers where adjacent optical fibers are in contact with each other, and forming a second plurality of optical fibers where adjacent optical fibers are in contact with each other. Each optical fiber has the first fiber diameter. Polishing the bottom surfaces of the first plurality of optical fibers in Step 1108 includes creating cross-sectional flat surfaces having a width about equal to the first fiber diameter. Likewise, polishing the top surfaces of the second plurality of optical fibers in Step 1110 includes creating cross-sectional flat surfaces having a width about equal to the first fiber diameter.

In one aspect, Step 1105 deposits a ring of fixing agent (e.g., epoxy or wax) inside the frame perimeter, encasing the optical fibers. Subsequent to the fixing agent being enabled, Step 1109 breaks the attachment between the optical fibers and the securing means. For example, the fiber between the ring and the frame are cut. If a single mesh frame is being used (see FIG. 8), Step 1109 may be performed either before or after Step 1110.

In a different aspect, subsequent to polishing the optical fiber top and bottom surfaces in Steps 1108 and 1110, Step 1111a disables or removes the fixing agent. For example, if the fixing agent is wax, the wax can be heated. Step 1111b reduces the spacing between adjacent optical fibers in the first plurality of optical fibers, and between adjacent optical fibers in the second plurality of optical fibers. Step 1111c re-enables or reapplies the fixing agent.

In another aspect, see FIGS. 9 and 10A through 10E, providing the rigid frame structure in Step 1102 includes providing a frame with a frame thickness, a frame top opening, and a frame bottom opening. Securing the mesh of optical fibers to the frame perimeter in Step 1104 includes securing a first mesh in the frame top opening and a second mesh in the frame bottom opening. Each mesh includes a first and second plurality of optical fibers. Alternately, instead of a frame, the means used to secure the optical fiber in Step 1104 can be an adhesive tape. Polishing the bottom surfaces of the first plurality of optical fibers in Step 1108 includes creating cross-sectional flat surfaces having a cross-sectional width greater than 50% of the optical fiber diameters. Polishing the top surfaces of the second plurality of optical fibers in Step 1110 includes, subsequent to the fixing agent being enabled (Step 1105 and breaking the attachment between the optical fibers and the frame (Step 1109), creating cross-sectional flat surfaces having a cross-sectional width greater than 50% of the optical fiber diameters.

Using either the frame or tape securing means, creating the micro array of lens assemblies in Step 1112 includes substeps. In the second mesh, Step 1112a separates the first plurality of optical fibers from the second plurality of optical fibers. Step 1112b interposes the first plurality of optical fibers from the second mesh between the first plurality of optical fibers from the first mesh. Step 1112c interposes the second plurality of optical fibers from the second mesh between the second plurality of optical fibers from the first mesh;

In anther variation, Step 1106 forms a mesh from the first and second plurality of optical fibers, each fiber having a first index of refraction. Prior to polishing the optical fibers, Step 1107 forms an interposer plate having a plano surface adjacent hemicylindrical top surfaces of the first plurality of optical fibers and a plano surface adjacent hemicylindrical bottom surfaces of the second plurality of optical fibers. The interposer plate has a thickness between plano surfaces, and typically has an index of refraction that is close to, or the same as the first index of refraction. Then, creating the micro array of lens assemblies in Step 1112 includes each lens assembly having a magnification factor responsive to the interposer plate thickness.

A micro array lens made from optical fibers has been provided with an associated fabrication method. Details of parts, geometries, and process steps have been given to illustrate the invention. However, the invention is not limited to merely these examples. Other variations and embodiments of the invention will occur to those skilled in the art.

I claim:

1. An optical fiber micro array lens comprising:
a mesh of optical fibers, the mesh including:
a first plurality of cylindrical optical fibers, each fiber from the first plurality having a flat bottom surface and a hemicylindrical top surface, the top and bottom surfaces aligned in parallel with a central fiber axis; and,
a second plurality of cylindrical optical fibers, each fiber from the second plurality having a hemicylindrical bottom surface overlying and in contact with the top surfaces of the first plurality of optical fibers, and a flat top surface, the top and bottom surfaces aligned in parallel with a central fiber axis; and,
wherein each contact of the first and second plurality of optical fibers forms a lens assembly in a micro array of lenses.

2. The micro array lens of claim 1 wherein the central axes of first plurality of optical fibers are parallel to each other, the central axes of the second plurality of optical fibers are parallel to each other and orthogonal to the first plurality of optical fiber central axes.

3. The micro array lens of claim 2 wherein adjacent optical fibers in the first plurality of optical fibers are in contact with each other, and adjacent optical fibers in the second plurality of optical fibers are in contact with each other.

4. The micro array lens of claim 3 wherein the optical fibers in the first and second plurality of optical fibers have a cross-sectional width across their flat surfaces that is less than the diameter of the optical fibers and greater than, or equal to the radius of the optical fibers.

5. The micro array lens of claim 2 wherein each optical fiber in the first and second plurality of optical fibers has a hemicylindrical radius; and,
wherein the mesh of optical fibers includes a spacing of up to 100% of the optical fiber hemicylindrical radius between adjacent optical fibers in the first plurality of optical fibers, and with a spacing of up to 100% of the optical fiber hemicylindrical radius between adjacent optical fibers in the second plurality of optical fibers.

6. The micro array lens of claim 1 wherein the first and second plurality of optical fibers are optical fiber cores.

7. The micro array lens of claim 1 wherein the mesh of optical fibers includes a ring of fixing agent.

8. The micro array lens of claim 7 wherein the fixing agent is selected from a group consisting of wax and epoxy.

9. The micro array lens of claim 1 wherein each optical fiber in the first and second plurality of optical fibers has a hemicylindrical radius; and,
wherein the lens have a focal length responsive to the optical fiber hemicylindrical radius.

10. The micro array of lens of claim 1 wherein the optical fibers in the first and second plurality of optical fibers each have a first index of refraction;
the micro array of lens further comprising:
an interposer plate having a plano surface adjacent the hemicylindrical top surfaces of the first plurality of optical fibers and a plano surface adjacent the hemicylindrical bottom surfaces of the second plurality of optical fibers, the interposer plate having a thickness between plano surfaces and the first index of refraction; and,
wherein each lens assembly includes a section of interposer plate between corresponding fibers in the first and second plurality of fibers, and has a magnification factor responsive to the interposer plate thickness.

* * * * *